Patented Aug. 14, 1923.

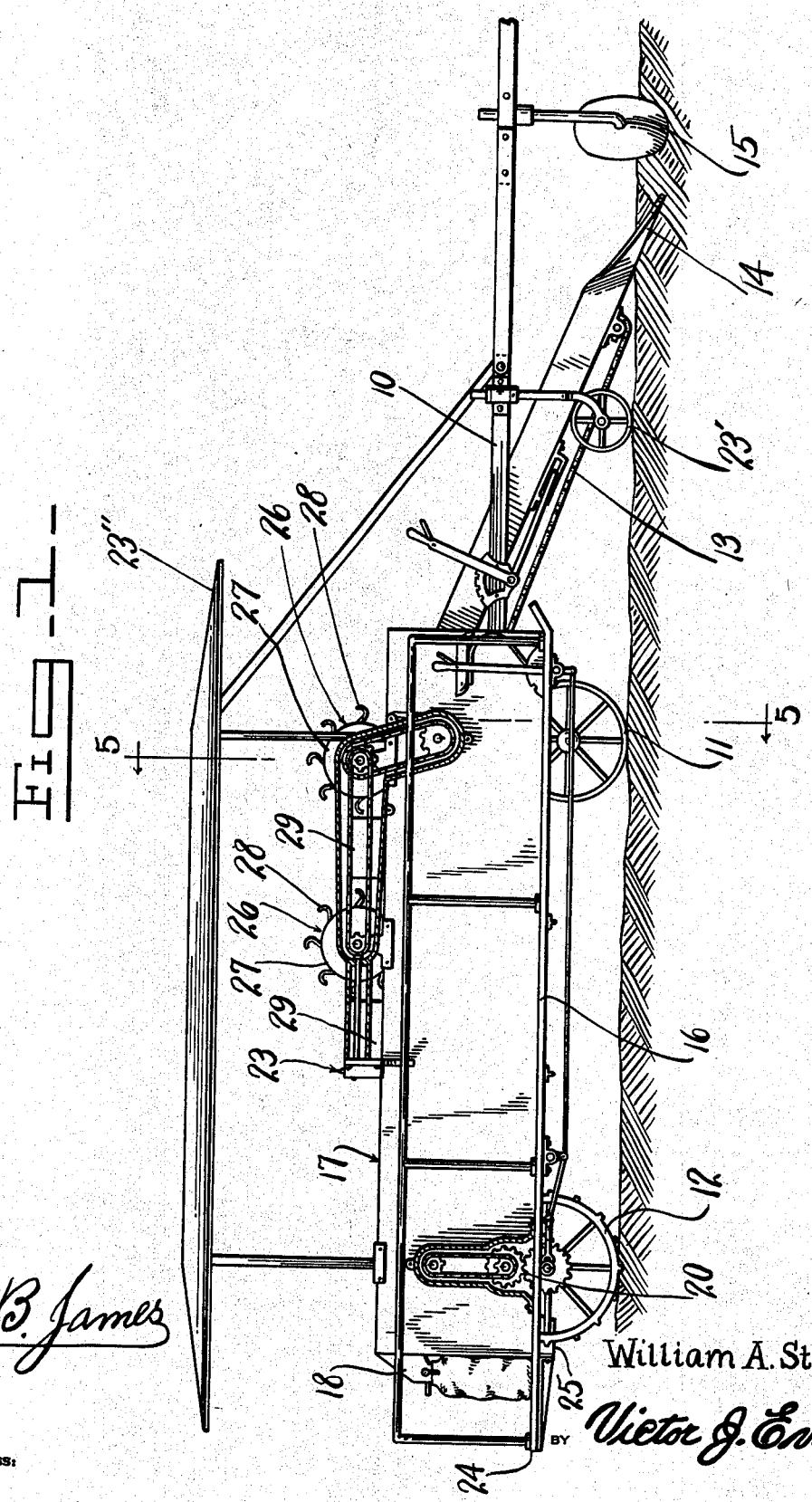

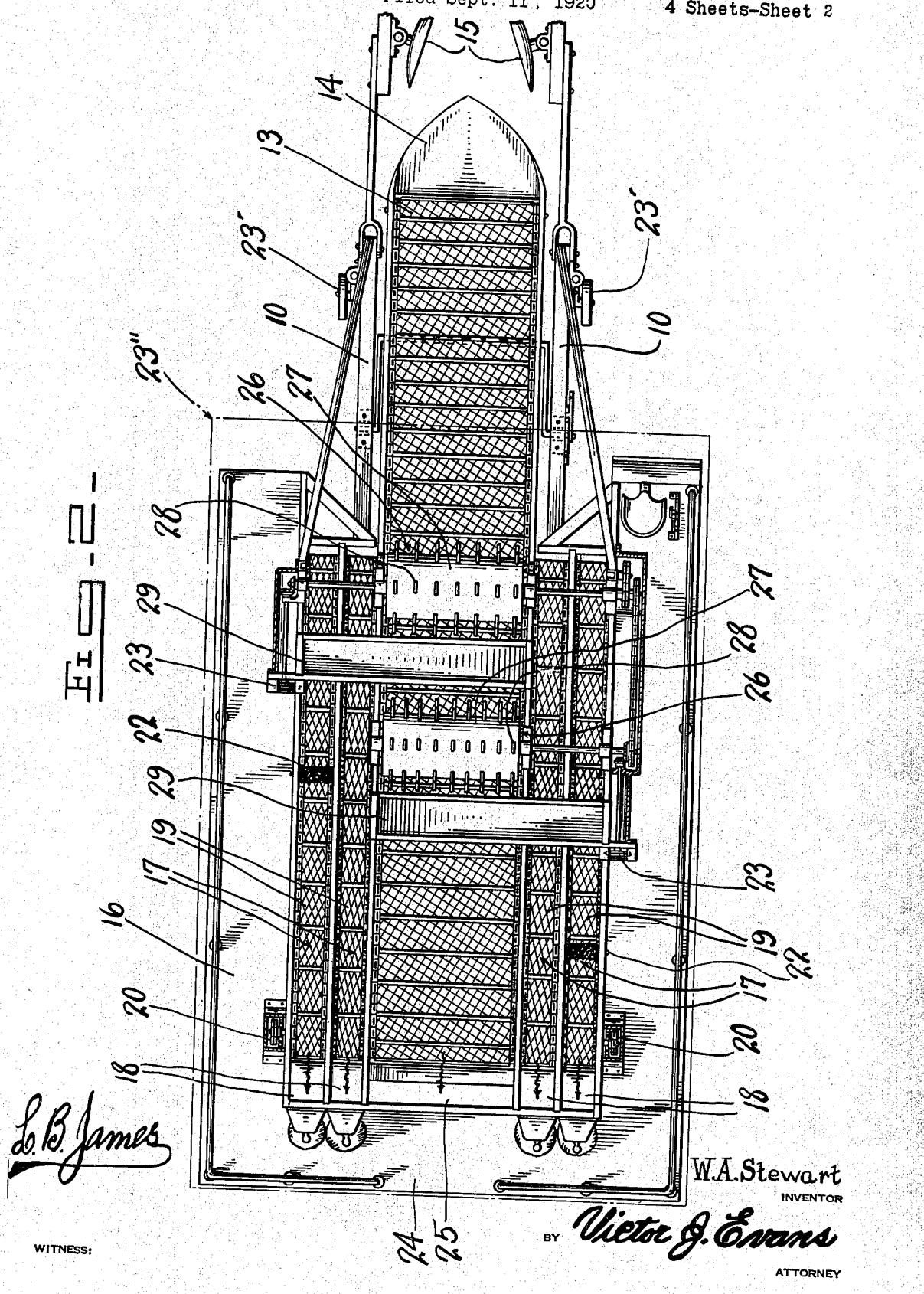

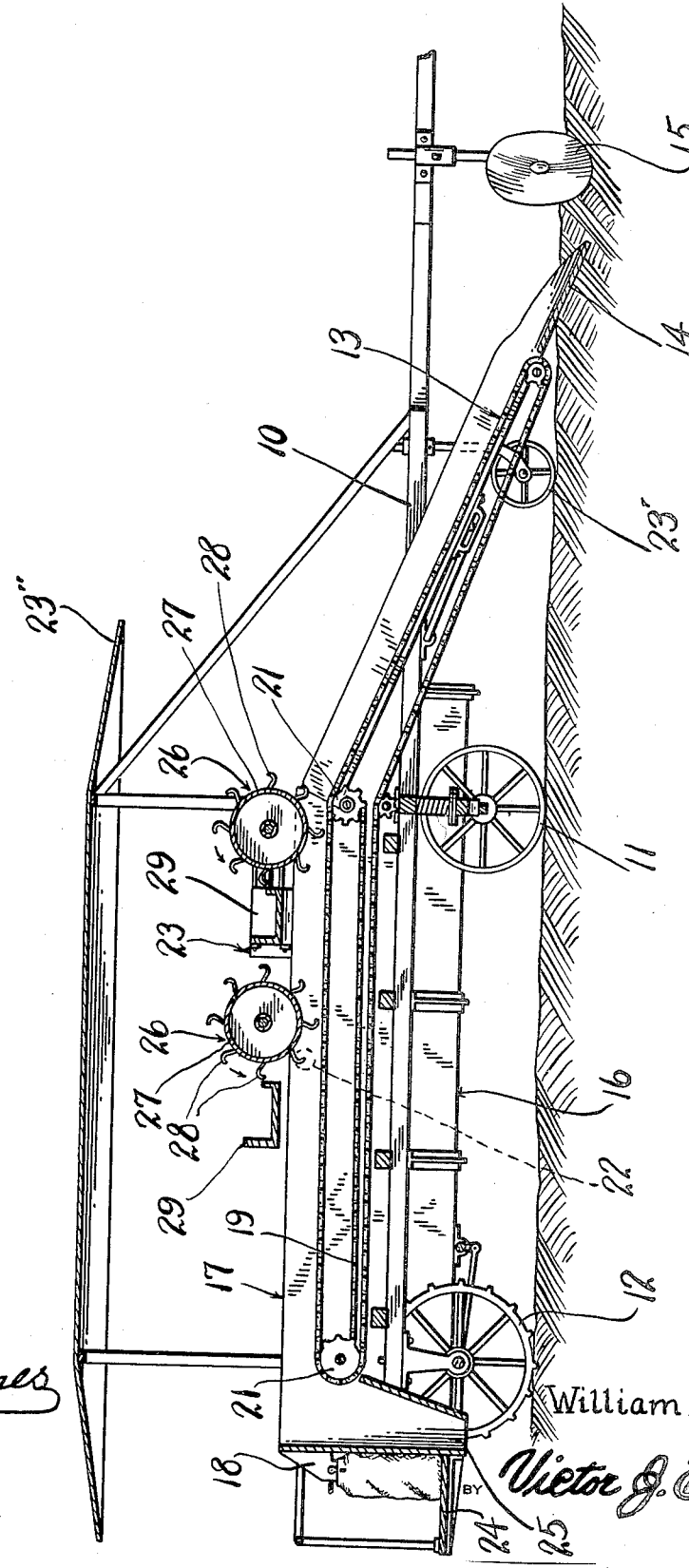

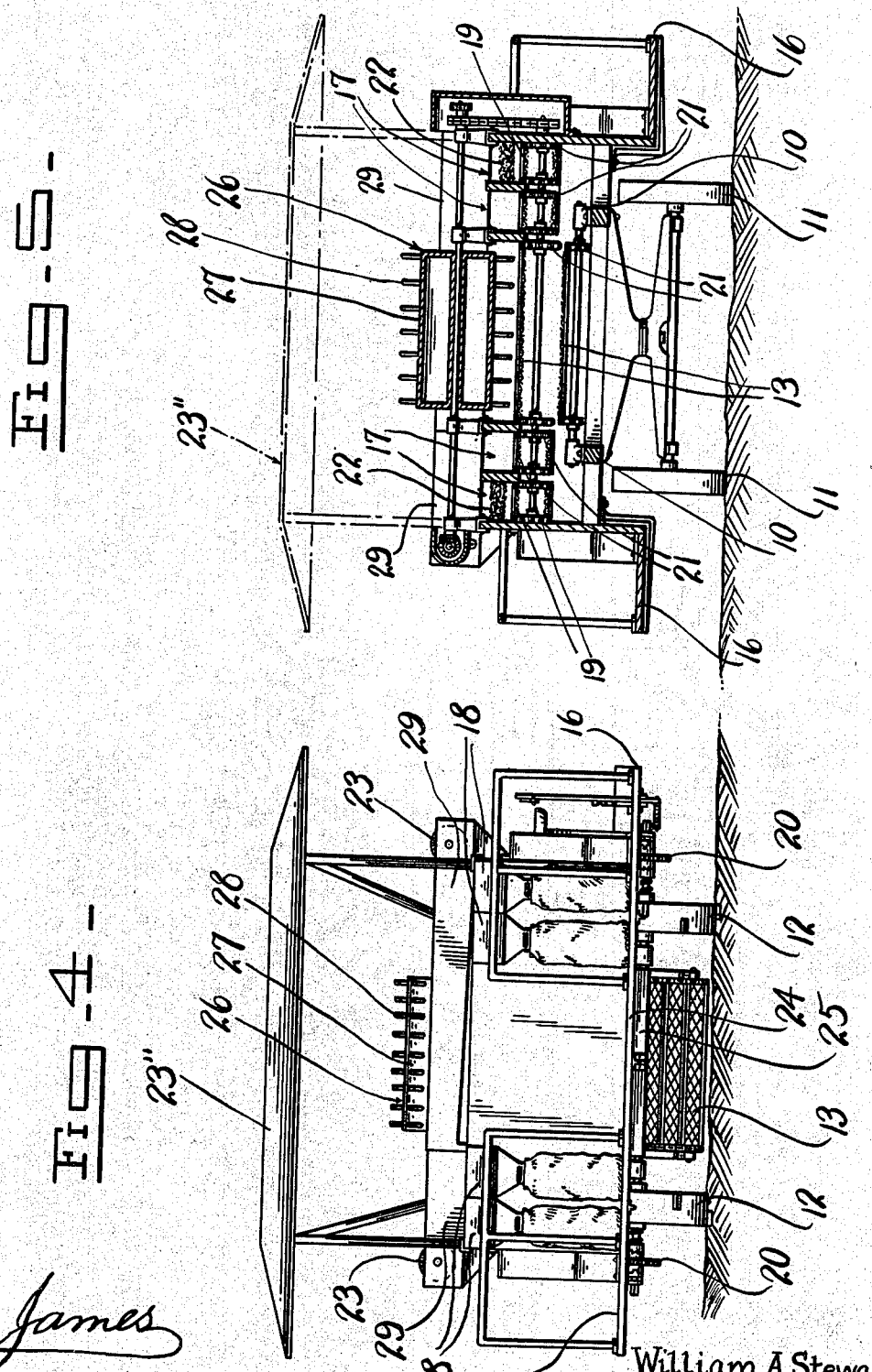

1,465,190

UNITED STATES PATENT OFFICE.

WILLIAM A. STEWART, OF SAN FRANCISCO, CALIFORNIA.

HARVESTER.

Application filed September 11, 1920. Serial No. 409,546.

*To all whom it may concern:*

Be it known that I, WILLIAM A. STEWART, a subject of the King of Great Britain, residing at San Francisco, in the county of San Francisco and State of California, have invented new and useful Improvements in Harvesters, of which the following is a specification.

The object of the invention is to provide a harvester especially designed for root crops such as potatoes, onions, turnips, carrots, beets and the like wherein the product may readily be loosened and lifted from the soil and conveyed to within convenient reach of the operators; to provide for sorting the same as to size and condition and for such other manipulation in the way of topping and the like as may be deemed necessary or desirable; and with these objects in view, the invention consists in a construction and combination of parts of which a preferred embodiment is shown in the accompanying drawings wherein:

Figure 1 is a side view of the machine.

Figure 2 is a plan view.

Figure 3 is a longitudinal central sectional view.

Figure 4 is a rear view.

Figure 5 is a transverse section on the plane indicated by the line 5—5 of Figure 1.

The machine embodies a main horizontal framework 10 supported by front and rear ground wheels 11 and 12 which are preferably peripherally spurred so as to properly engage the surface of the soil and serve as traction wheels in the event that the machine is motor driven and otherwise to serve as a means whereby the operating parts of the mechanism may be given motion and disposed centrally and longitudinally of the frame work is a carrier 13 consisting of an endless belt which at the forward end of the frame work is depressed to occupy a downwardly and forwardly inclined position to serve as an elevator leading from a front shovel or scoop 14 by which the crop is lifted from the soil after the latter has been loosened at each side of the row of plants by means of advanced soil engaging devices such as plows, coulters, cutters or the like indicated at 15 and obviously adaptable in form and construction to suit the crop to be handled and the character of the soil in which the machine is operating, a device or disk 15 preferably being arranged on each side of the row, so that the soil is effectively disturbed to permit of the ready lifting of the potatoes or other articles therefrom to be received by the front end of the elevator and thence conveyed to the horizontal portion of the carrier upon each side of which the frame work of the machine supports a platform 16 for the support of the attendant whose duty it is to sort the crop and place the same in one or the other of a plurality of chutes 17 which are arranged longitudinally of the frame and parallel with the carrier at opposite sides thereof and extend rearwardly to suitable receptacles indicated at 18, said chutes being provided with endless aprons 19 which in common with the carrier 13 are actuated by the ground wheels through suitable gearing indicated at 20. The aprons, of the chutes are carried by suitable sprocket wheels 21 and disposed at suitable points intermediately of the chutes are brushes 22 and chopping knives 23 also operatively connected with the ground wheels or other suitable operating mechanism.

The projecting forward end of the frame work in advance of the forward ground wheel 11 is supported by coulter wheels 23' and preferably extending over the body of the machine including the side platforms is a conopy frame 23" for the protection and convenience of the attendant, while a rear platform 24 may be extended transversely of the frame connecting the rear ends of the side platforms to enable the operators to manipulate the receptacles into which the crops are conveyed by the chute. Said rear platform may be cut away as indicated at 25 to allow the loosened earth and tops to drop to the ground at the rear end of the carrier. Also preferably located at the forward end of the carrier at the top of the elevator or inclined portion of the carrier is a sorting drum 26 designed for selecting the largest specimens of the crops and consisting of a drum 27 provided with curved baskets or cups 28 consisting of transversely spaced curved fingers located at intervals which will support large potatoes or other articles and will allow the smaller specimens to pass therebetween, said sorting wheels or drums of which two are shown being arranged to deposit the selected specimens of the crop in hoppers 29 leading to one of the chutes 17 on opposite sides of the carrier while the sorting of the remainder of the product may be effected as above described by the attendant who can conveniently reach over the chutes and individually select the potatoes or other articles from the carrier and deposit them in the proper chute.

It will be obvious from the foregoing description that a crop can be handled with great facility and economy by means of a mechanism such as described in that substantially all of the products will be harvested and presented to the attendant on the machine in such a way as to enable them to sort the same for subsequent deposit in separate receptacles or bins, so that repeated handling of the crop is avoided.

Having thus described my invention what I claim as new is:—

In a potato harvester, an endless carrier, chutes parallel therewith, independent conveyors within the chutes, shafts extending through the walls of the chutes, sprocket wheels carried by the shafts within the separate chutes, for driving the conveyors therein, rotatable cleaning devices within some of the chutes and mounted above the conveyors, permitting the potatoes to pass under the cleaning devices while carried rearwardly by the conveyors, and mechanism for driving said shafts and cleaning devices.

In testimony whereof I affix my signature.

WILLIAM A. STEWART.